US010817381B2

(12) United States Patent
Gudivada et al.

(10) Patent No.: US 10,817,381 B2
(45) Date of Patent: Oct. 27, 2020

(54) AUTOMATED UICC RECOVERY

(71) Applicant: QUALCOMM Incorporated, San Diego, CA (US)

(72) Inventors: Naga Chandan Babu Gudivada, Hyderabad (IN); Venkata Raji Reddy Kanthala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 16/265,380

(22) Filed: Feb. 1, 2019

(65) Prior Publication Data

US 2020/0250045 A1 Aug. 6, 2020

(51) Int. Cl.
*G06F 11/00* (2006.01)
*G06F 11/14* (2006.01)
*H04W 88/02* (2009.01)
*H04W 4/70* (2018.01)

(52) U.S. Cl.
CPC ...... *G06F 11/1448* (2013.01); *G06F 2201/84* (2013.01); *H04W 4/70* (2018.02); *H04W 88/02* (2013.01)

(58) Field of Classification Search
CPC .................................................. G06F 11/1448
See application file for complete search history.

(56) References Cited

U.S. PATENT DOCUMENTS 9,172,418 B1 * 10/2015 Sudabattula ...... H04W 52/0261
2017/0006463 A1 * 1/2017 Michel .................. H04W 8/183

FOREIGN PATENT DOCUMENTS

| CN | 104580695 A | | 4/2015 |
|---|---|---|---|
| CN | 105376758 A | | 3/2016 |
| CN | 104079724 B | * | 9/2016 |
| CN | 104079724 B | | 9/2016 |
| WO | WO-2016074390 A1 | * | 5/2016 ............ H01M 10/46 |

OTHER PUBLICATIONS

International Search Report and Written Opinion—PCT/US2020/016226—ISA/EPO—dated Apr. 20, 2020.

* cited by examiner

*Primary Examiner* — Katherine Lin
(74) *Attorney, Agent, or Firm* — Qualcomm Incorporated; Nerrie M. Zohn

(57) ABSTRACT

Deployment of UICCs in IoT and M2M devices requires that the interface between UICC functions reliably in extreme temperature conditions. Extreme conditions may cause communication failures between the UICC and its device. The present application proposes various methods and devices for automatic recovery from UICC failure and UICC communication failures, commonly associated with extreme conditions (e.g., high temperature, low temperature, physical shock). The automatic recovery procedure includes applying one or more increased drive strength to the identity card, and may further include varying voltage and/or clock rate.

30 Claims, 6 Drawing Sheets

AUTOMATED UICC RECOVERY

BACKGROUND

A wireless communication device may include one (or more) subscriber identity modules (SIMs), which the wireless communication device may use to communicate with one or more cells of a wireless communication network. A SIM is an integrated circuit that is intended to securely store the international mobile subscriber identity (IMSI) number which serves to identify and authenticate subscribers on mobile devices (such as mobile phones and computers). SIM cards are used on GSM phones, and LTE handsets. SIM cards can also be used in satellite phones, smart watches, computers, or cameras.

Embedded SIMs are a typical choice for machine-to-machine (M2M) applications, such as internet-of-things (IoT) environments because they come embedded onto a device's circuit board. Embedded SIMs (eSIM), also referred to as a Universal Integrated Circuit Cards (UICC), have benefits over traditional removable SIMs. The GSMA Embedded SIM Specification provides a standard mechanism for remote provisioning and management of M2M connections. This allows for "over the air" provisioning of the SIM. These SIMs can be remotely provisioned to connect to an initial operator and subsequent operators. Further, embedded SIMs have better reliability in terms of reducing malfunction due to shocks, corrosion and other environmental factors. Additionally, the lifecycle of an embedded SIM is usually 10 years, longer than that of a standard SIM form factor.

SUMMARY

The following presents a simplified summary of one or more aspects in order to provide a basic understanding of such aspects. This summary is not an extensive overview of all contemplated aspects, and is not intended to identify key or critical elements of all aspects or delineate the scope of any or all aspects. Its sole purpose is to present some concepts of one or more aspects in a simplified form as a prelude to the more detailed description presented later.

When deploying UICCs in IoT and M2M devices, the interface between UICC and the device should function reliably in extreme conditions (e.g., high temperature, low temperature, physical shock). However, extreme conditions may cause communication failures between the UICC and a device. The present application proposes various methods and apparatus capable of automatically recovering from UICC failure and/or UICC communication failures, commonly associated with extreme conditions.

In one aspect of the disclosure, a method, a computer-readable medium, and an apparatus are provided. The apparatus may be a user equipment, such as a cellular handset, an IoT device, M2M device, MTC device, or other category of communication device. The apparatus may access an identity card (e.g., SIM, eSIM, UICC). The apparatus may detect timeout of an identity card and perform a recovery procedure for the identity card, wherein the recovery procedure comprises applying at least one increased drive strength to the identity card, which may then receive an answer-to-reset (ATR) from the identity card in response to the recovery procedure. The recovery procedure may include applying a plurality of drive strengths to the identity card, including iteratively increasing the drive strength. The drive strength may be a data drive strength. In one example, a clock drive strength is kept constant while the data drive strength is interactively increased. The recovery procedure may further include operating the identity card using a plurality of clock rates or applying a plurality of voltages to the identity card. Finally, the recovery procedure may include iteratively applying, to the identity card, a combination of a drive strength, a voltage, or a clock rate determined from at least two sets from a set of data drive strengths, a set of clock drive strengths, a set of reset line drive strengths, a set of clock rates, or a set of voltages.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1:
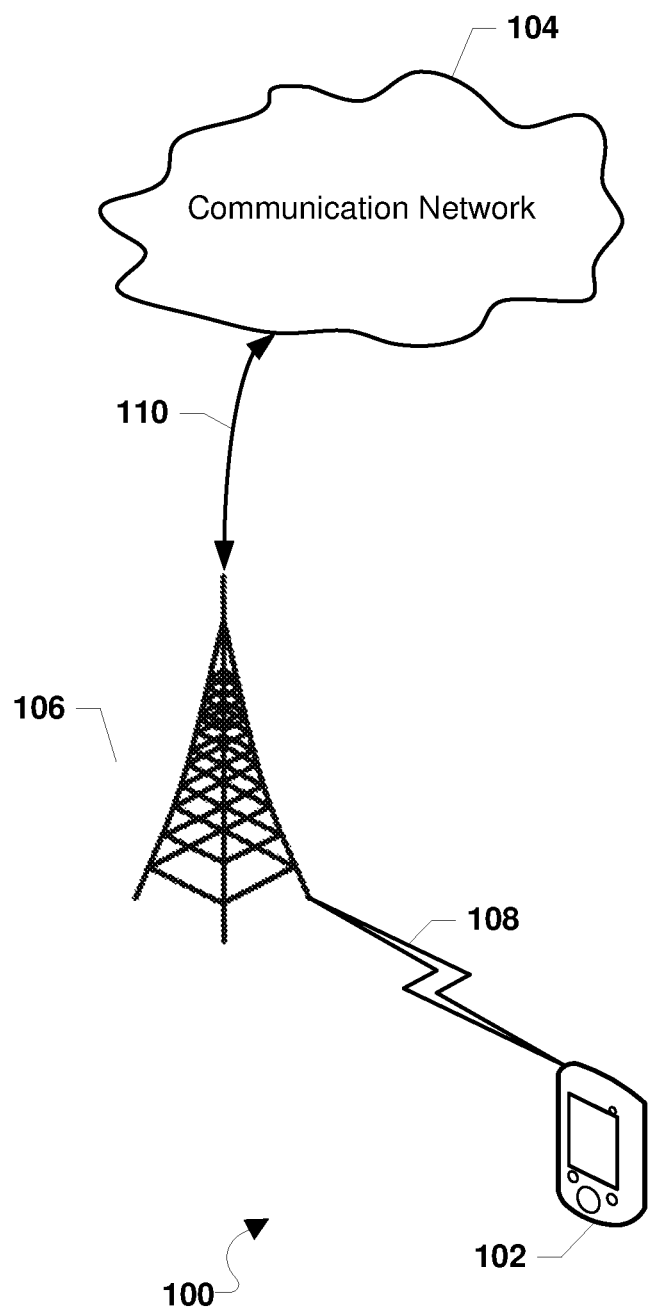
FIG. 1 is a communication system block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

The term "wireless communication device" is used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, IoT devices, M2M communication devices, wireless-enabled sensors, wireless-enabled appliances, and similar electronic devices that include a programmable processor and memory and circuitry for establishing wireless communications and transmitting/receiving data via wireless communications. Alternatively, the wireless communication device may be a component of another device for providing access to wireless communications.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A wireless communication device may include connectors for one (or more) SIM cards. A SIM enables the wireless communication device to access one or more communication networks (or one or more subscriber accounts on the same network). A SIM card may identify and authenticate a subscriber using a particular communication device, and the SIM card may be associated with a subscription. In various embodiments, the wireless communication device may also include one or more RF resource chains that may each be used for RF reception and transmission.

A wireless communication device may be capable of communicating over a variety of frequency bands, wireless communication systems (e.g., wide area network (WAN), Wireless Fidelity (Wi-Fi), or Near Field Communication (NFC)), and radio access technologies (RATs) within a WAN (e.g., 3GPP Long Term Evolution (LTE), 5G New Radio (NR), Global System for Mobility (GSM), and Wideband Code Division Multiple Access (WCDMA)). To use different frequency systems and/or radio access technologies, a wireless communication device may include two or more radio transceivers.

Various embodiments may be implemented in wireless communication devices that may operate within a variety of communication systems, particularly systems that include communication networks. FIG. 1 illustrates a communication system 100 suitable for use with various embodiments. A wireless communication device 102 may communicate with a communication network 104. The communication network 104 may include one or more base stations (e.g., cellular base station 106).

The wireless communication device 102 may communicate with the first communication network 104 through a communication link 108 to the base station 106. The first base station 124 may communicate with the first communication network 104 over a wired or wireless communication link 110, which may include fiber optic backhaul links, microwave backhaul links, and other similar communication links. In some embodiments, the communication networks may include mobile telephony communication networks. In another embodiment, the communication network may be a private industrial communication network employed in manufacturing and/or device synchronization or coordination.

While the communication link 108 is illustrated as a single link, the communication links 108 may include a plurality of carrier signals, frequencies, or frequency bands, each of which may include a plurality of logical channels. In some embodiments, the communication links 108 may include cellular communication links using a wireless communication protocol such as 5G NR, LTE, GSM, WCDMA, Worldwide Interoperability for Microwave Access (WiMAX), Code Division Multiple Access (CDMA), Time Division Multiple Access (TDMA), and other mobile telephony communication technologies.

Figure 2:
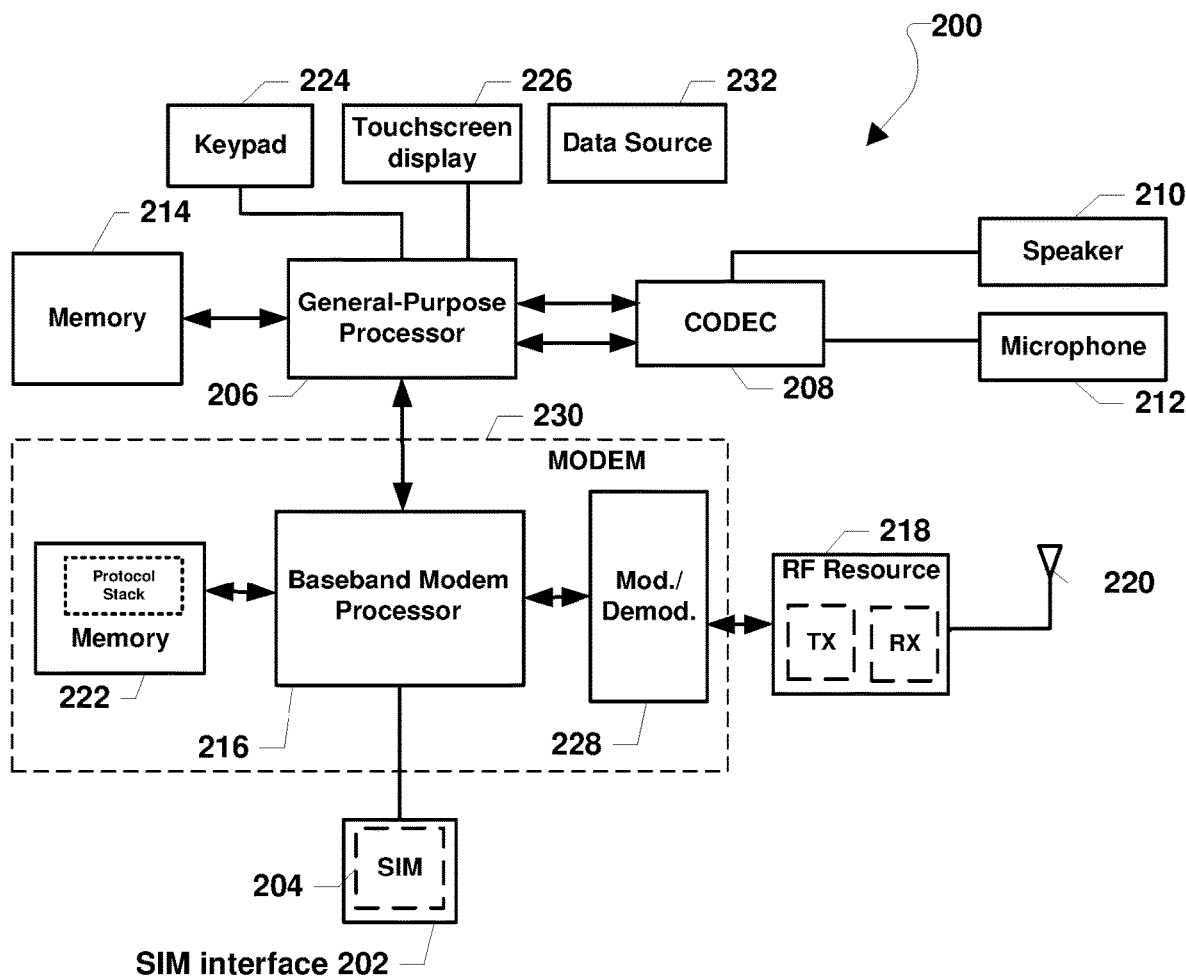
FIG. 2 is a block diagram illustrating a wireless communication device according to various embodiments.

FIG. 2 is a component block diagram of a wireless communication device 200 suitable for implementing various embodiments. With reference to FIGS. 1 and 2, in various embodiments, the wireless communication device 200 may be similar to the wireless communication device 102. The wireless communication device 200 may include a subscriber identity module (SIM) interface 202, which may receive an identity module SIM 204 that is associated with a subscription.

A SIM in various embodiments may be a Universal Integrated Circuit Card (UICC) that is configured with SIM and/or USIM (Universal Subscriber Identity Module) applications, enabling access to, for example, wireless communication networks. The UICC may also provide storage for a phone book and other applications. A SIM used in various embodiments may contain user account information, an international mobile subscriber identity (IMSI), a set of SIM application toolkit (SAT) commands and storage space. A SIM card may further store a Home-Public-Land-Mobile-Network (HPLMN) code to indicate the SIM card network operator provider. An Integrated Circuit Card Identity (ICCID) SIM serial number may be printed on the SIM card for identification. The SIM may be an embedded SIM (e.g., a UICC) that is permanently embedded in a communication device.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory computer-readable storage medium that stores processor-executable instructions. For example, the instructions may include routing communication data relating to the first or second subscription through a corresponding baseband-RF resource chain. The memory 214 may store an operating system, as well as application software and executable instructions. The memory 214 may also store application data.

The general-purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors. The modulator/demodulator 228 may receive data from the baseband modem processor 216 and may modulate a carrier signal with encoded data and provide the modulated signal to an RF resource 218 for transmission. The modulator/demodulator 228 may also extract an information-bearing signal from a modulated carrier wave received from an RF resource 218, and may provide the demodulated signal to the baseband modem processor 216. The modulator/demodulator 228 may be or include a digital signal processor (DSP).

The baseband modem processor 216 may read and write information to and from the memory 222. The memory 222 may also store instructions associated with a protocol stack, such as a protocol stack. A protocol stack generally includes computer executable instructions to enable communication using a radio access protocol or communication protocol. The protocol stack typically includes network protocol layers structured hierarchically to provide networking capabilities. A protocol stack may be associated with the SIM card 204 (e.g., a UICC) and/or a subscription. For example, the protocol stack may be associated with the SIM 204. The memory 222 may store one or more protocol stacks (not illustrated).

The SIM 204 in the wireless communication device 200 may be coupled to the modem 230 and may be associated with or permitted to use at least one RF resource chain per RAT. A RAT (e.g., a LTE RAT, 5G NR RAT) may be associated with RF resource 218. Wireless communication device 200 may operate and communicate with SIM 204 via SIM interface 202. The SIM interface 202 may communicate with SIM 204 using a plurality of input and output lines matched to pins on SIM 204. SIM interface 202 may operate SIM 204 using a plurality of input lines including, but not limited to, a voltage line, a reset line, a clock line, a ground line, and a data line. The SIM interface 202 may also receive output from SIM 204 via a plurality of output lines including, but not limited to, a voltage line, a clock line, a ground line, and a data line.

Each baseband-RF resource chain may include the baseband modem processor 216 to perform baseband/modem functions for communicating with/controlling a RAT, and one or more amplifiers and radios, referred to generally herein as RF resources. In some embodiments, baseband-RF resource chains may share a common baseband modem processor 216 (i.e., a single device that performs baseband/modem functions for all RATs on the wireless communication device). Alternatively, each baseband-RF resource chain may include the physically or logically separate baseband processors.

The RF resources 218 may include transceivers associated with one or more RATs and may perform transmit/receive functions for the wireless communication device 200 on behalf of their respective RATs. The RF resources 218 may include separate transmit and receive circuitry. The RF resources 218 may be coupled to a wireless antenna (e.g., a wireless antenna 220). The RF resources 218 may also be coupled to the modem 230 (e.g., via the modulator/demodulator 228, or alternatively via the baseband modem processor 216 or another component). The term "RF resource chain" may include an RF resource (e.g., the RF resource 218), an antenna (e.g., the antenna 220), and one or more components of the modem 230.

In some embodiments, the general-purpose processor 206, memory 214, baseband processor(s) 216, and RF resource 218 may be included in the wireless communication device 200 as a system-on-chip. Conversely, the general-purpose processor 206, memory 214, baseband processor(s) 216, and RF resource 218 may be the packaged as separate components in a device. SIM 204 and corresponding interface 202 may be external to the system-on-chip. Further, various input and output devices may be coupled to components on the system-on-chip, such as interfaces or controllers. The wireless device 200 may or may not include input components such as, but not limited to, a keypad 224, data source 232, and/or a touchscreen display 226. Data source 232 may be a sensor, appliance, or any device capable of providing data to the wireless communication device.

In some embodiments, the keypad 224, touchscreen display 226, data source 232, microphone 212, or a combination thereof, may perform the function of receiving the request to initiate an outgoing communication. For example, the touchscreen display 226, keypad 224, or microphone 212 may function to initiate an outgoing communication. As another example, the request to initiate the outgoing communication may be user driven or device driven (i.e., algorithmically driven). Interfaces may be provided between the various software modules and functions in the wireless communication device 200 to enable communication between them.

When deploying UICCs in IoT and M2M devices, the interface between the UICC and the device should function reliably in extreme conditions. However, extreme conditions may trigger communication failures between a device and its UICC. It is common for UICCs to timeout in different climatic conditions. In extreme climatic conditions, the eSIM card may need more current to respond to Application Protocol Data Unit (APDU) commands sent to the card. This can be due to a failure at the UICCs interface (e.g., the contacts or touch points between the device a UICCs fail to communicate). The problem is compounded by the fact that a UICC cannot simply be removed and replaced, as it is an embedded component in a device.

Conventionally, when communication with the UICC fails, the user is forced to re-power the device or the device software triggers silent recovery one or more times using the last successful operating configuration for the card. The last successful operating configuration for the card may correspond to a last successful clock rate, voltage, and drive strength(s) used to operate the card before declaring a card error. This can also include specific drive strengths of the various input lines of the card (e.g., reset line, clock line, data line). If there is no response from the card after repeated communication attempts the device gives up and declares failure.

The present application proposes various methods and devices to automatically recover from UICC failure and UICC communication failures, commonly associated with extreme conditions (e.g., high temperature, low temperature, physical shock). In one embodiment, the device may use varied drive strengths, clock rates, and voltages when performing a recovery procedure to improve the likelihood of successful UICC recovery.

Figure 3:
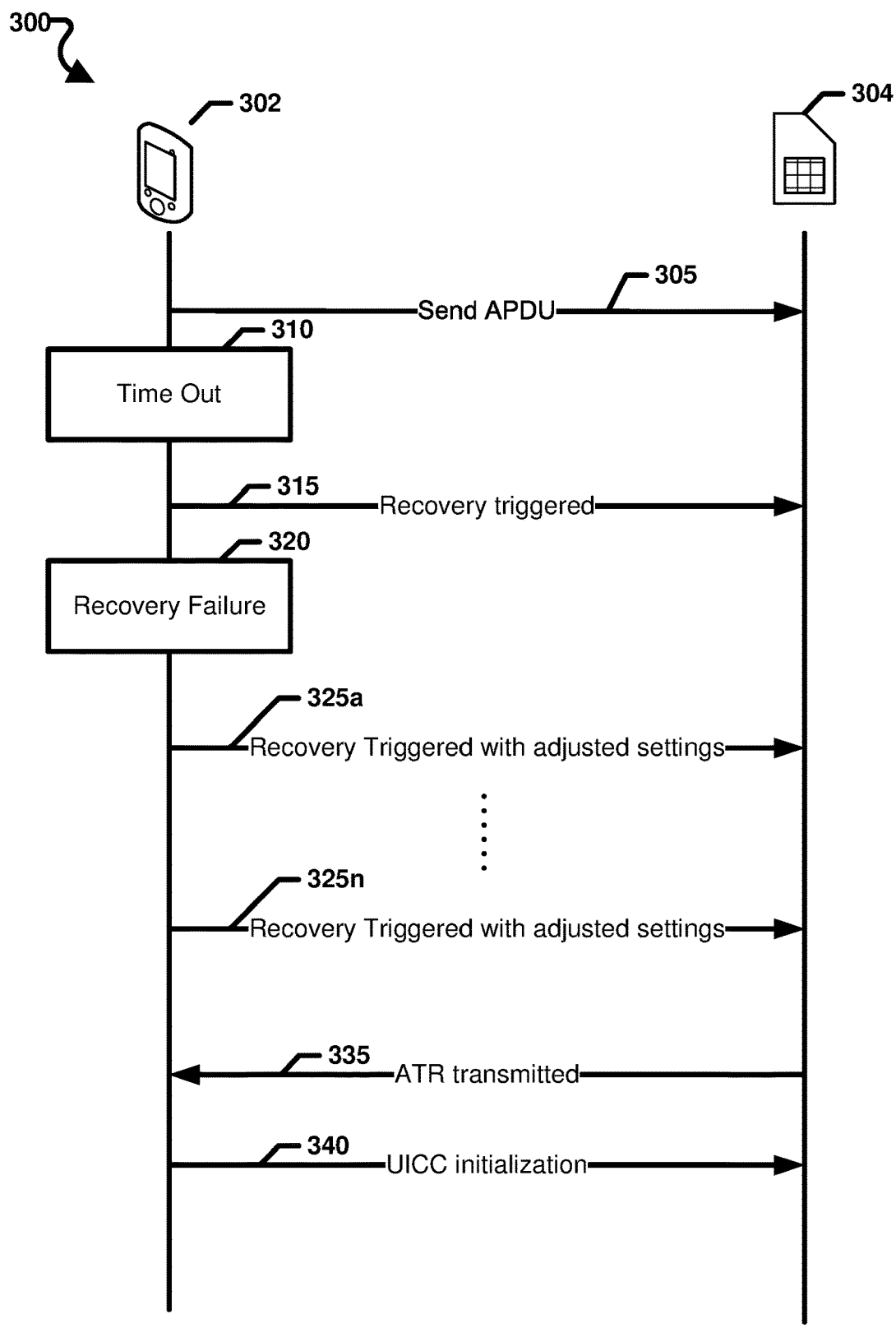
FIG. 3 is a block diagram illustrating an identity card recovery procedure according to various embodiments.

FIG. 3 illustrates a process 300 by which a UE 302 attempts to perform a recovery procedure when detecting a timeout associated with UICC 304. The process illustrates communication between UE 302 and UICC 304. While shown as separate devices, as noted above, with reference to FIG. 2, UICC 304 may be a component of UE 302 and the communication between the UE 302 and UICC 304 may be between the UICC and a baseband processor of the UE 302. UE 302 and UICC 304 communicate via a UICC interface (not shown).

At 305, the UE 302 communicates an APDU to UICC 304.

At 310, the UE 302 detects a timeout associated with UICC 304. The timeout may result due to the UICC 304 failing to respond to the APDU within a predetermined time period. Alternatively, the UE 302 may detect an error that triggers a recovery procedure (e.g., parity errors in data line communication from the UICC), or the recovery procedure may be manually triggered by the network or a user.

At 315, in response to the timeout 310, the UE 302 may perform a recovery procedure to reset the UICC 304. This recovery procedure may include attempting to communicate a reset command to the UICC using the last successful operating configuration associated with the UICC 304. For example, the UE 302 may use the last successful operating configuration associated with the UICC 304. Thereafter, UE 302 may monitor for an ATR response from UICC 304. If the UE 302 does not receive an ATR response from the UICC 304 within a specified period of time, the UE 302 may again send the reset command to the UICC 304 and await an ATR response. This process may of sending a reset request and awaiting an ATR response may be repeated a specified number of times. If no ATR response is received after the process is repeated the specified number of time (e.g., 3), the UE 302 may declare a UICC recovery failure.

At 320, the UE 302 detects a recovery failure associated with UICC 304. This may be, for example, a timeout resulting from a failure of the UICC 304 to provide an answer-to-reset (ATR) response or detection of signaling errors in the UICC response (e.g., parity errors in the data provided by the UICC to the UE 302).

Following 320, the UE 302 may perform a dynamic recovery procedure to reset the UICC 304. This dynamic recovery procedure may include attempting to communicate a reset command to the UICC using different drive strengths, clock rates, or voltages. At 325a to 325n, the UE 302 may attempt to iteratively send UICC 304 a reset command using different drive strengths, clock rates, or voltages (and monitor for an ATR) until, at 335, the UICC successfully returns an ATR response. Alternatively, the UE 302 may determine, after sending a plurality of reset commands, that the UICC is not recoverable.

At 340, after receiving an ATR from UICC 304, the UE 302 may perform UICC initialization.

As noted above, the dynamic recovery procedure may include attempting to communicate a reset command to the UICC using different drive strength, clock rates, or voltages. Drive strength refers to the current that can be drawn by the UICC on a given input line, while maintaining the appropriate voltages for logic level inputs. Increasing the drive strength of a line increases a corresponding output current from the UICC, and so affects the voltage received by the UICC. Drive strength may be increased for various input lines from the UE to the UICC. For example, at a previously drive strength on a given line, a voltage at UICC input may be 1.2V. By increasing the current on the given line, the voltage at UICC input may rise to 1.8V. Drive strength can be different for the data line, clock line, and reset line. Accordingly, it is possible to vary or increase the line strengths for the data line, clock line, and reset line. Increasing the drive strength from a line, while maintaining the same voltage, allows more amps to be drawn from the output of the UICC.

Furthermore, increasing the drive strength for a given line, makes that line more robust to climate conditions. For example, if there is hardware interference or climatic conditions, an input line signal (e.g., a clock line signal) may not reach the UICC or the UICC may experience some distortions. Increasing the drive strength may eliminate or reduce the interference, allowing the signal to pass to the UICC.

For example, the UE may initially send a reset command using a low drive strength (e.g., 2 mA) to the reset line. If no response is detected, the UE may then incrementally increase the drive strength of the line and retry sending the reset command to the UICC until it reaches a maximum drive strength (e.g., 16 mA). By example, the UE 302 may iterate through reset commands using drive strengths of 2 mA, 4 mA, 6 mA, 8 mA, and 16 mA.

Serial communication with the UICC is based on a clock rate that is driven by a clock pin at the UICC via the clock line. Conventional UICCs may support two clock rates: 3.8 Mhz and 4.8 MHz (also referred to as 4 Mhz and 5 Mhz). If a UICC was last operated at 4.8 MHz, the UE 302 may attempt to change the clock rate to a lower clock rate to improve the likelihood of a UICC response. For example, the UE may attempt to reduce the clock rate from 4.8 Mhz to 3.8 Mhz when performing the dynamic recovery procedure.

Additionally, the UE 302 may attempt to change the input voltage to the UICC. UE 302 may support operating the UICC at different voltages and may attempt varying the input voltage provided to the UICC. For example, the UICC 304 may support voltages of 3V and 1.8V (which may correspond to class B and class C devices). UICC 304 may also support 5V (corresponding to class E devices).

In a further example, the UE 302 may iteratively vary all three variables (e.g., drive strength, clock rate, and voltage). The UE 302 may also vary drive strengths between the data line, clock line, and reset line. In one example, an implementation of the dynamic recovery procedure may employ three nested loops, varying drive strength in an inner loop, varying voltage in a middle loop, then varying clock rate in the outer loop. Alternatively, the different combinations of drive strengths, clock rates, and voltages may be placed into a set of all possible value combinations, and the UE 302 may iterate through the different combinations of elements of the set (each element corresponding to a different combination of drive strength, clock rate, and voltage). Furthermore, the implementation may include variation of the drive strengths for the data line, clock line, and reset line.

Figure 4:
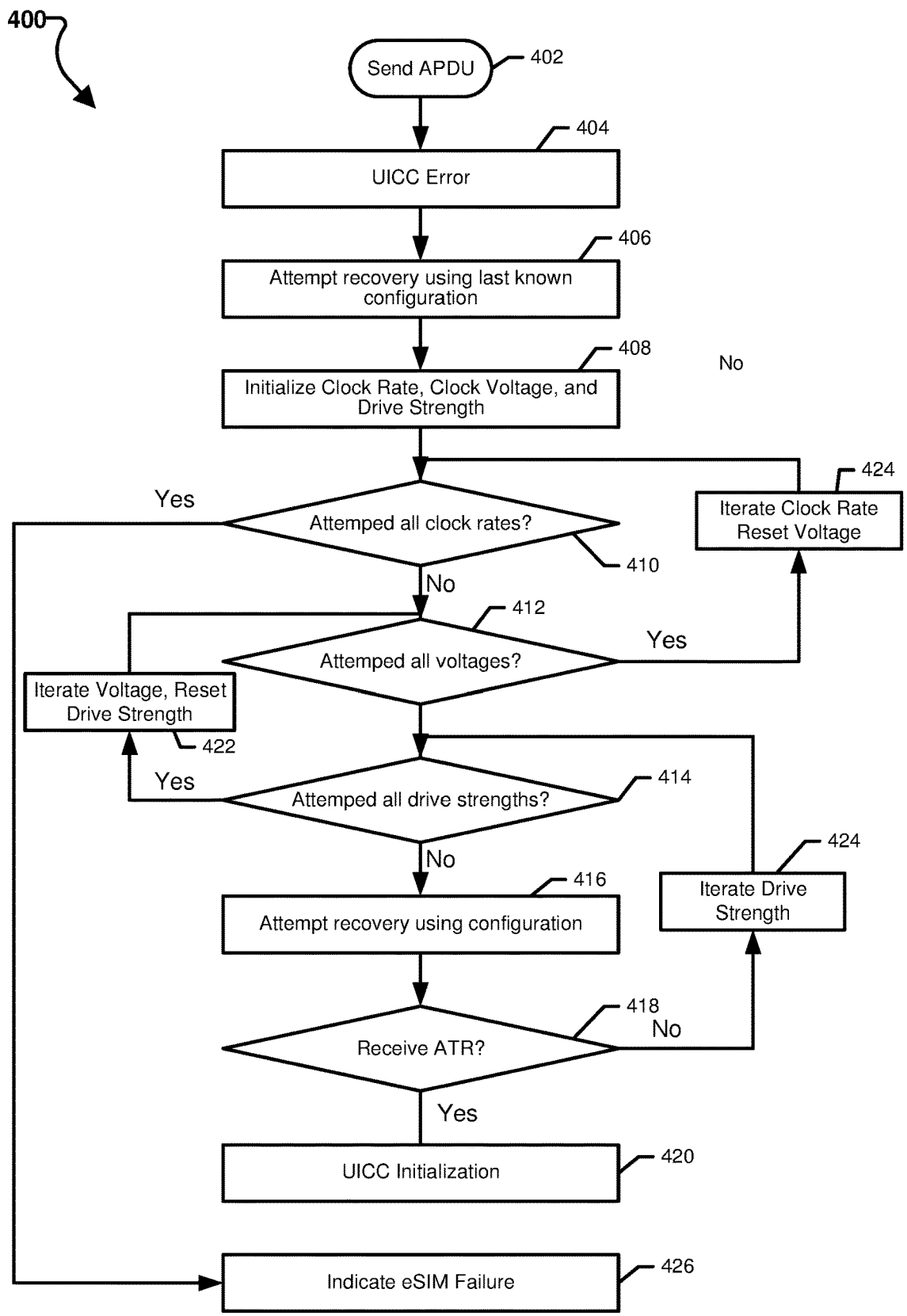
FIG. 4 is a process flow diagram illustrating a nested loop identity card recovery procedure according to various embodiments.

FIG. 4 illustrates an example of a procedure for performing a UICC recovery procedure. The procedure employs three nested loops, varying drive strength in an inner loop, varying voltage in a middle loop, and varying clock rate in the outer loop.

At 402, the UE communicated an APDU to UICC. At 404, the UE detects an error associated with UICC. The error may be a timeout (e.g., if the UICC fails to respond to the APDU within a predetermined time period), detection of an error that triggers a recovery procedure (e.g., parity errors in communications from the UICC), or the recovery procedure may be triggered by the network or a user.

At 406, the UE 406 may perform a simple recovery procedure to reset the UICC. This recovery procedure may include attempting to send a reset command to the UICC on the reset line using the last successful operating configuration associated with the UICC. Thereafter, UE may monitor for an ATR response from UICC. The UE may attempt to send a reset command to the UICC using the last successful operating configuration a predetermined number of times (e.g., 3).

At 408, the UE initializes the clock rate, the voltage, and the drive strength to an initial set of values. The initial values may be based on the last known UICC operating configuration, or may correspond to a minimal or power optimal set of values. For example, or alternatively, the clock rate may be set to 4.8 Mhz, the voltage may be set to 1.8V, and the drive strength may be set to 2 mA.

At 410, the UE determines if recovery has been attempted with all clock rates. Alternatively, the UE may check if the last recovery attempt used the lowest clock rate (e.g., 3.8 MHz). If all clock rates have been attempted or the maximum clock rate has been attempted, the UE may indicate an UICC failure at 426. If recovery should be attempted with further clock rates, the process proceeds to 412.

At 412, the UE determines if recovery has been attempted with all voltages. Alternatively, the UE may check if the last recovery attempt used the maximum voltage (e.g., 3V or 5V). If all voltages have been attempted or the maximum voltage has been attempted, then the UE, at 424, may iterate to the next clock rate, reset the voltage, and return to 410. If recovery should be attempted with further voltages, then the process proceeds to 414.

At 414, the UE determines if recovery has been attempted with all drive strengths. Alternatively, the UE may check if the last recovery attempt used the maximum drive strength (e.g., 16 mA). If all drive strengths have been attempted or the maximum drive strength has been attempted, then the UE, at 422, may iterate to the next voltage, reset the drive strength, and return to 412. If recovery should be attempted, then the process proceeds to 416.

At 416, the UE attempts to transmit a reset command to the UICC using a clock rate, voltage, and drive strength. At 418, if the UE receives an ATR from the UICC, then the UE can begin UICC initialization, at 420. If the UE does not receive an ATR within a timeout period, then the UE iterates to the next drive strength (e.g., increases the drive strength), at 424, and proceeds to 414.

While FIG. 3 illustrates an example of a UICC recovery procedure using nested loops, other implementations would fall within coverage of the present invention. Alternative examples could iterate over combinatorial sets of clock rates, voltages, and drive strength values. Furthermore, the nested loops of method 300 may be restructured in different arrangements.

Figure 5:
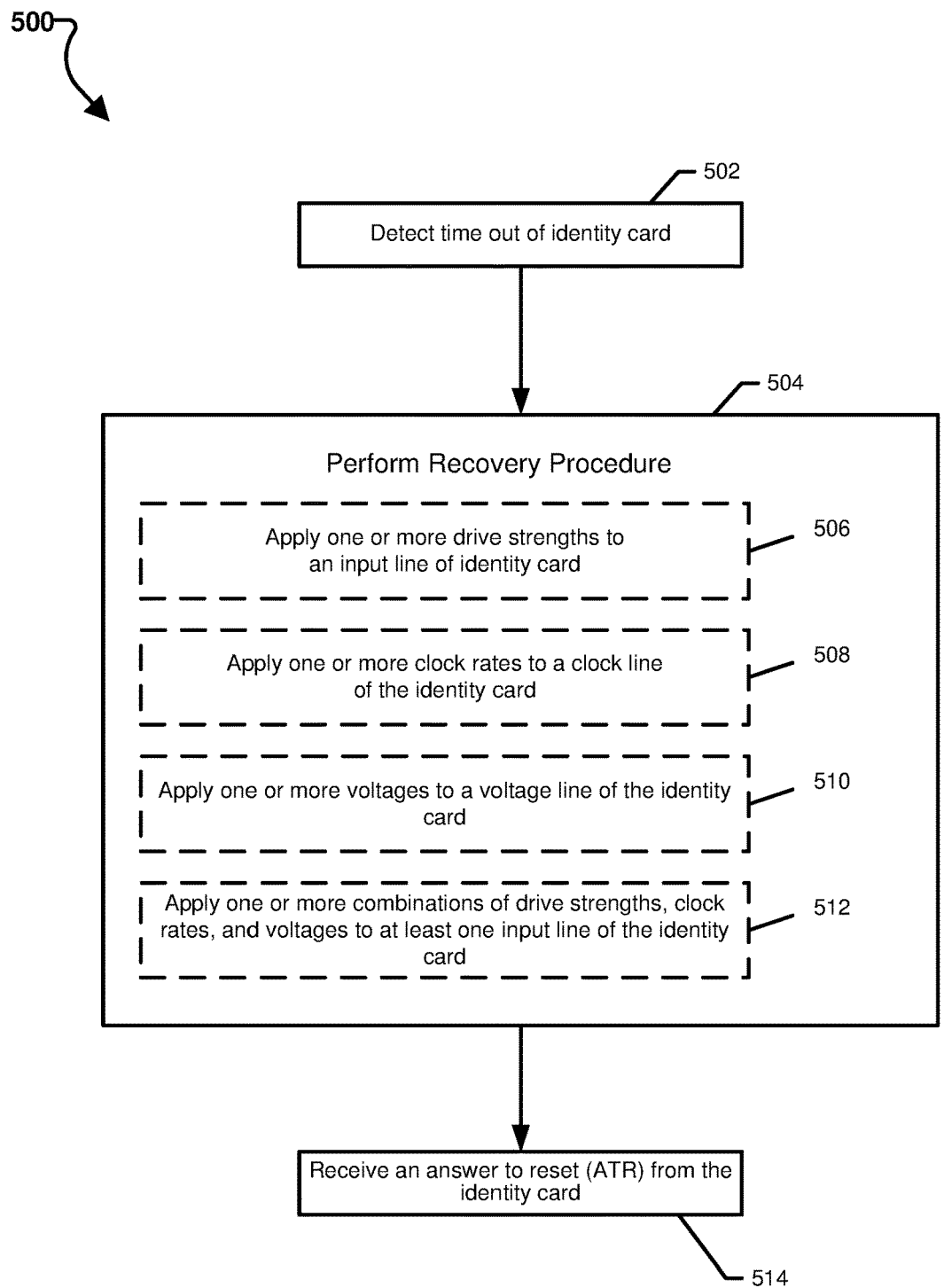
FIG. 5 is a method diagram illustrating an identity card recovery procedure

FIG. 5 illustrates a method 500 of performing UICC recovery. The method automatically recovers from UICC failure and UICC communication failures, commonly associated with extreme conditions. The method may be performed by a UE. The UE may be an IoT device, MTC device, or any network device employing an identity card, such as a SIM, eSIM, or UICC. Optional steps or implementations are illustrated using dashed lines.

At step 502, UE may detect a timeout of an identity card. The timeout may result when the identity card fails to respond to a data line communication within a predetermined time period. Alternatively, the UE 302 may detect an error that triggers a recovery procedure (e.g., parity errors in communications from the UICC), or the recovery procedure may be triggered by the network or a user At step 504, UE may perform a recovery procedure. Step 504 may be implemented using one or a combination of sub-step 506, 508, 510, and/or 512. The recovery procedure may apply a plurality of drive strengths to at least one input line associated with the identity card 506. The recovery procedure may include applying at least one increased drive strength to the at least one input line associated with the identity card, relative to a drive strength associated with a previously known successful operating configuration. This can include iteratively increasing the drive strength. The drive strength may be applied to a data line. In one example, the UE may keep a voltage or a clock rate (applied to the identity card via the respective lines) constant while the data line or reset line drive strength is iteratively increased. The recovery procedure may include operating a clock line associated with the identity card using a plurality of clock rates 508 or operating a voltage line associated with the identity card using a plurality of voltages 510. Furthermore, the recovery procedure may further comprise iteratively applying to the identity card, combinatorial sets of drive strengths, voltages, or clock rates 512. The drive strengths, voltages, or clock rates may be selected from a set of data line drive strengths, a set of clock line drive strengths, a set of reset line drive strengths, a set of clock rates, or a set of voltages.

At step 514, UE may receive an ATR response from the identity card in response to the recovery procedure. Following receipt of the ATR response, the UE may perform UICC initialization using the last attempted combination of drive strength, clock rate, and voltage used during the recovery procedure.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Figure 6:
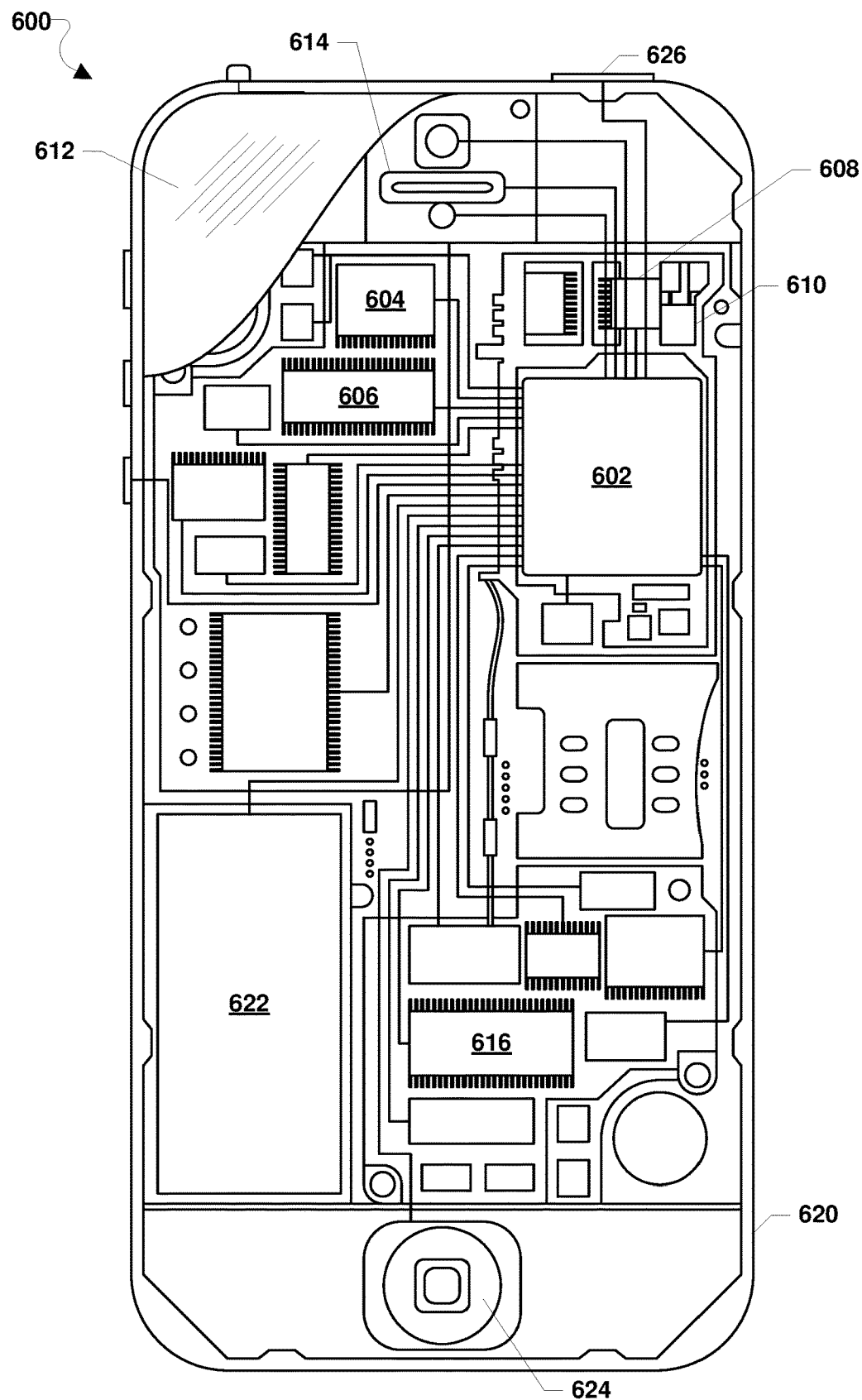
FIG. 6 is a component diagram of an example wireless communication device suitable for use with the various aspects.

Various embodiments (including, but not limited to, embodiments discussed above with reference to FIGS. 1-5) may be implemented in any of a variety of wireless communication devices, an example of which (e.g., wireless communication device 600) is illustrated in FIG. 6. With reference to FIGS. 1-5, in various embodiments, the wireless communication device 600 (which may correspond, for example, to the wireless communication devices 102 and 200) may include a processor 602 coupled to a touchscreen controller 504 and an internal memory 606. The processor 602 may be one or more multi-core integrated circuits designated for general or specific processing tasks. The internal memory 606 may be volatile or non-volatile memory, and may also be secured and/or encrypted memory, or unsecured and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc. Additionally, the display of the wireless communication device 600 need not have touch screen capability.

The wireless communication device 600 may have two or more radio signal transceivers 608 (e.g., Peanut, Bluetooth, ZigBee, Wi-Fi, RF radio) and antennae 610, for sending and receiving communications, coupled to each other and/or to the processor 602. The transceivers 608 and antennae 610 may be used with the above-mentioned circuitry to implement the various wireless transmission protocol stacks and interfaces. The wireless communication device 600 may include one or more cellular network wireless modem chip(s) 616 coupled to the processor and antennae 610 that enable communication via two or more cellular networks via two or more radio access technologies.

The wireless communication device 600 may include a peripheral device connection interface coupled to the processor 602. The peripheral device connection interface may be singularly configured to accept one type of connection, or may be configured to accept various types of physical and communication connections, common or proprietary, such as USB, FireWire, Thunderbolt, or PCIe. The peripheral device connection interface may also be coupled to a similarly configured peripheral device connection port (not shown).

In addition, the wireless communication device 600 may include speakers 614 for providing audio outputs. The wireless communication device 600 may also include a housing unit 620, constructed of plastic, metal, or a combination of materials, for containing all or some of the components discussed herein. The wireless communication device 600 may include a power source 622 coupled to the processor 602, such as a disposable or rechargeable battery. The rechargeable battery may also be coupled to the peripheral device connection port to receive a charging current from a source external to the wireless communication device 600. The wireless communication device 600 may include a physical button 624 for receiving user inputs. The wireless communication device 600 may also include a power button 626 for turning the wireless communication device 600 on and off.

The processor 602 may be any programmable microprocessor, microcomputer or multiple processor chip or chips that can be configured by software instructions (applications) to perform a variety of functions, including the functions of various embodiments described below. In some wireless communication devices, multiple processors 602 may be provided, such as one processor dedicated to wireless communication functions and one processor dedicated to running other applications. Typically, software applications may be stored in the internal memory 606 before they are accessed and loaded into the processor 602. The processor 602 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory, so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for accessing an identity card at a wireless communication device, comprising:
   detecting timeout of an identity card at the wireless communication device;
   performing a recovery procedure for the identity card, wherein the recovery procedure comprises applying a drive strength to at least one input line associated with the identity card, the drive strength being greater than a drive strength associated with last successful operating configuration of the identity card for the at least one input line;
   receiving an answer to reset (ATR) from the identity card, in response to the recovery procedure.

2. The method of claim 1, further comprising sending an application data unit (APDU) to the identity card.

3. The method of claim 1, wherein the recovery procedure further comprises applying a plurality of drive strengths to the at least one input line associated with the identity card.

4. The method of claim 3, wherein the applying the plurality of drive strengths to the at least one input line associated with the identity card includes iteratively increasing the drive strength of the at least one input line.

5. The method of claim 4, wherein the at least one input line includes a data line.

6. The method of claim 5, wherein a clock line drive strength is kept constant while the data line drive strength is iteratively increased.

7. The method of claim 1, wherein the recovery procedure further comprises operating a clock line associated with the identity card using a plurality of clock rates.

8. The method of claim 1, wherein the recovery procedure further comprises operating a voltage line associated with the identity card using a plurality of voltages.

9. The method of claim 1, wherein the wireless device is a user equipment.

10. The method of claim 1, wherein the recovery procedure further comprises iteratively operating the at least one input line using a combination of a drive strength, a voltage, or a clock rate determined from at least two of
    a set of data line drive strengths;
    a set of clock line drive strengths;
    a set of reset line drive strengths;
    a set of clock rates; or
    a set of voltages.

11. A wireless communication device, comprising:
    a memory;
    an identity card interface;
    an identity card; and
    a processor coupled to the memory and the identity card interface, and configured to:
        detect timeout of an identity card at the wireless communication device;
        perform a recovery procedure for the identity card, wherein the recovery procedure comprises applying a drive strength to at least one input line associated with the identity card, the drive strength being greater than a drive strength associated with last successful operating configuration of the identity card for the at least one input line; and
        receive an answer to reset (ATR) from the identity card, in response to the recovery procedure.

12. The wireless communication device of claim 11, wherein the recovery procedure further comprises sending an application data unit (APDU) to the identity card.

13. The wireless communication device of claim 11, wherein the recovery procedure further comprises applying a plurality of drive strengths to the at least one input line associated with the identity card.

14. The wireless communication device of claim 13, wherein the recovery procedure further comprises applying the plurality of drive strengths to the at least one input line associated with the identity card includes iteratively increasing the drive strength of the at least one input line.

15. The wireless communication device of claim 14, wherein the at least one input line includes a data line.

16. The wireless communication device of claim 15, wherein a clock line drive strength is kept constant while the data line drive strength is iteratively increased.

17. The wireless communication device of claim 11, wherein the recovery procedure further comprises operating a clock line associated with the identity card using a plurality of clock rates.

18. The wireless communication device of claim 11, wherein the recovery procedure further comprises operating a voltage line associated with the identity card using a plurality of voltages a plurality of voltages to the identity card.

19. The wireless communication device of claim 11, wherein the wireless device is a user equipment.

20. The wireless communication device of claim 11, wherein the recovery procedure further comprises iteratively applying to the identity card, a combination of a drive strength, a voltage, or a clock rate determined from at least two of
    a set of data drive strengths;
    a set of clock drive strengths;
    a set of reset line drive strengths;
    a set of clock rates; or
    a set of voltages.

21. A wireless communication device, comprising:
    an identity card interface;
    an identity card; and
    means for detecting timeout of an identity card at the wireless communication device;
    means for performing a recovery procedure for the identity card, wherein the recovery procedure comprises applying a drive strength to at least one input line associated with the identity card, the drive strength being greater than a drive strength associated with last successful operating configuration of the identity card for the at least one input line; and means for receiving an answer to reset (ATR) from the identity card, in response to the recovery procedure.

22. The wireless communication device of claim 21, further comprising sending an application data unit (APDU) to the identity card.

23. The wireless communication device of claim 21, wherein the recovery procedure further comprises applying a plurality of drive strengths to the at least one input line associated with the identity card.

24. The wireless communication device of claim 23, wherein the applying the plurality of drive strengths to the at least one input line associated with the identity card includes iteratively increasing the drive strength of the at least one input line.

25. The wireless communication device of claim 24, wherein the at least one input line includes a data line.

26. The wireless communication device of claim 25, wherein a clock line drive strength is kept constant while the data line drive strength is iteratively increased.

27. The wireless communication device of claim 21, wherein the recovery procedure further comprises operating a clock line associated with the identity card using a plurality of clock rates.

28. The wireless communication device of claim 21, wherein the recovery procedure further comprises operating a voltage line associated with the identity card using a plurality of voltages a plurality of voltages to the identity card.

29. The wireless communication device of claim 21, wherein the recovery procedure further comprises iteratively applying to the identity card, a combination of a drive strength, a voltage, or a clock rate determined from at least two of a set of data drive strengths;

a set of clock drive strengths;

a set of reset line drive strengths;

a set of clock rates; or a set of voltages.

30. A non-transitory processor-readable storage medium having stored thereon processor-executable instructions configured to cause a processor of a wireless communication device to perform operations comprising:

detecting timeout of an identity card at the user equipment;

performing a recovery procedure for the identity card, wherein the recovery procedure comprises applying a drive strength to at least one input line associated with the identity card, the drive strength being greater than a drive strength associated with last successful operating configuration of the identity card for the at least one input line; and receiving an answer to reset (ATR) from the identity card, in response to the recovery procedure.

\* \* \* \* \*